United States Patent
Saito et al.

(10) Patent No.: US 8,523,305 B2
(45) Date of Patent: Sep. 3, 2013

(54) IMAGE FORMING APPARATUS

(75) Inventors: Tetsuya Saito, Yokohama (JP); Masaaki Ishibashi, Hino (JP); Daijirou Nagasaki, Kamakura (JP); Tetsuhiro Nitta, Yokohama (JP); Hiroshi Ogushi, Shiroi (JP); Yasuhiko Ikeda, Sagamihara (JP); Shigeyuki Sugiyama, Hiratsuka (JP); Haruyuki Yanagi, Machida (JP); Takeji Niikura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 753 days.

(21) Appl. No.: 12/556,817

(22) Filed: Sep. 10, 2009

(65) Prior Publication Data

US 2010/0060694 A1   Mar. 11, 2010

(30) Foreign Application Priority Data

Sep. 11, 2008  (JP) ................................. 2008-233168

(51) Int. Cl.
*H04N 1/034* (2006.01)
*B41J 2/155* (2006.01)
*B41J 3/36* (2006.01)
*B41J 2/435* (2006.01)
*G06K 15/00* (2006.01)
*H04N 1/21* (2006.01)
*H04N 1/23* (2006.01)
*H04N 5/225* (2006.01)

(52) U.S. Cl.
USPC ................. 347/3; 347/42; 347/109; 347/264; 358/1.18; 358/296; 348/207.2

(58) Field of Classification Search
USPC ............. 358/474, 537, 1.18; 347/3, 42, 109, 347/264; 348/207.2
See application file for complete search history.

(56) References Cited

U.S. PATENT DOCUMENTS

| 6,965,392 B2 | 11/2005 | Ogushi | |
|---|---|---|---|
| 8,049,936 B2 * | 11/2011 | Chen et al. | 358/474 |
| 2004/0066545 A1 * | 4/2004 | Hofler | 358/537 |

FOREIGN PATENT DOCUMENTS

| JP | 04333063 A | * 11/1992 |
| JP | 06-169364A A | 6/1994 |
| JP | 2006-205398A A | 8/2006 |
| JP | 2006-304142A A | 11/2006 |

* cited by examiner

*Primary Examiner* — Ryan Lepisto
*Assistant Examiner* — Erin Chiem
(74) *Attorney, Agent, or Firm* — Canon USA, Inc., IP Division

(57) ABSTRACT

An apparatus includes a printing unit which is disposed in a housing and configured to form an image on a sheet, an lid attached to the housing by a hinge mechanism, and a camera which is attached to the lid and configured to read an image on a document while the lid is open, wherein the sheet having the image formed by the printing unit is discharged on the lid, and when the lid is opened, the camera can read the document which is placed at a reading position below the camera.

10 Claims, 12 Drawing Sheets

IMAGE FORMING APPARATUS

BACKGROUND OF THE INVENTION

1. Field of the Invention

The present invention relates to an image forming apparatus capable of reading images.

2. Description of the Related Art

Multifunction peripherals (MFPs) capable of forming and reading an image on a sheet are known. Many of MFPs comprise a printing unit configured to form an image on a sheet, and a flat-bed type scanner unit having a platen disposed above the printing unit such that a reading surface thereof is horizontally arranged in a housing. This configuration in which the scanner unit is horizontally disposed at the top of a MFP improves operability of a user who places and removes a sheet onto and from the reading surface. U.S. Pat. No. 6,965,392 discusses the configuration of a typical MFP.

However, a MFP having such component arrangements has yet a problem to be addressed regarding reduction of footprint (an installation floor area occupied by the MFP). In other words, the footprint is determined by a projection area of the reading surface of the flat-bed type scanner, and cannot be further reduced. Depending on use environment of a user, it may be desired that the footprint is reduced as much as possible particularly when the MFP is not in use. However, it is difficult for conventional MFPs to meet this demand.

SUMMARY OF THE INVENTION

The present invention relates to an image forming apparatus which can reduce a footprint when it is not in use and is compact and easy to handle.

According to an aspect of the present invention, an apparatus includes a printing unit which is disposed in a housing and configured to form an image on a supplied sheet, an lid attached to the housing by a hinge mechanism so as to be opened and closed, and a camera which is attached to the lid and configured to read an image on a document while the lid is open, wherein the sheet having the image formed by the printing unit is discharged on the lid, and when the lid is opened, the camera can read the document which is placed at a reading position below the camera.

According to another aspect of the present invention, an apparatus includes a printing unit which is disposed in a housing and configured to form an image on a supplied sheet, an lid attached to the housing by a hinge mechanism so as to be opened and closed, and a camera which is attached to the lid and configured to read an image on a document sheet while the lid is open, wherein the camera is retractably attached to the lid, and while the lid is being opened, the camera rotates to face a reading position therebelow.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

As a first exemplary embodiment of the present invention, an inkjet type MFP, an example of an image forming apparatus, will be described below. However, the scope of the present invention is not restricted thereto. For example, the present invention is also applicable to devices for home and office use, devices employing electrophotographic, thermal, dot-impact, and other printing methods as well as to diverse types of image forming apparatuses such as commercial printing apparatuses.

Figure 1:
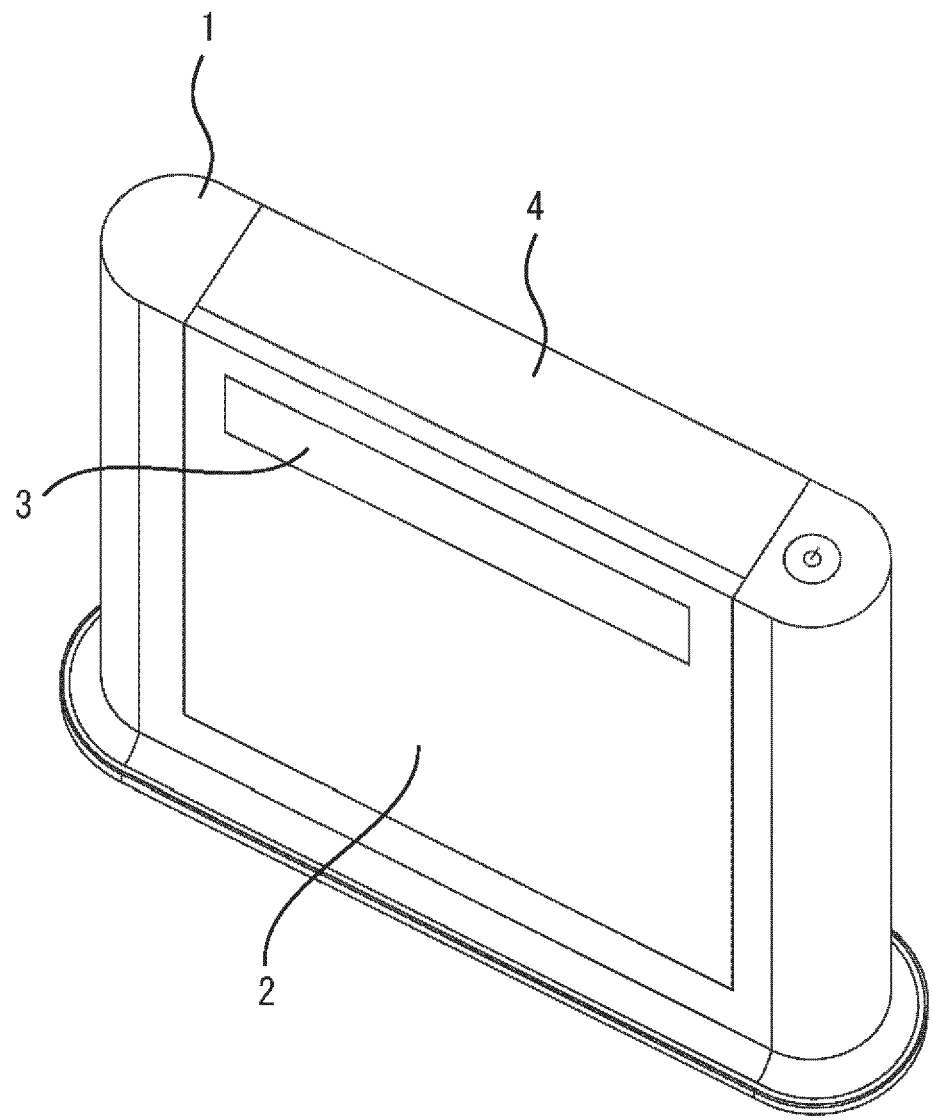
FIG. 1 illustrates an external view of an apparatus not in use according to a first exemplary embodiment.
Figure 2:
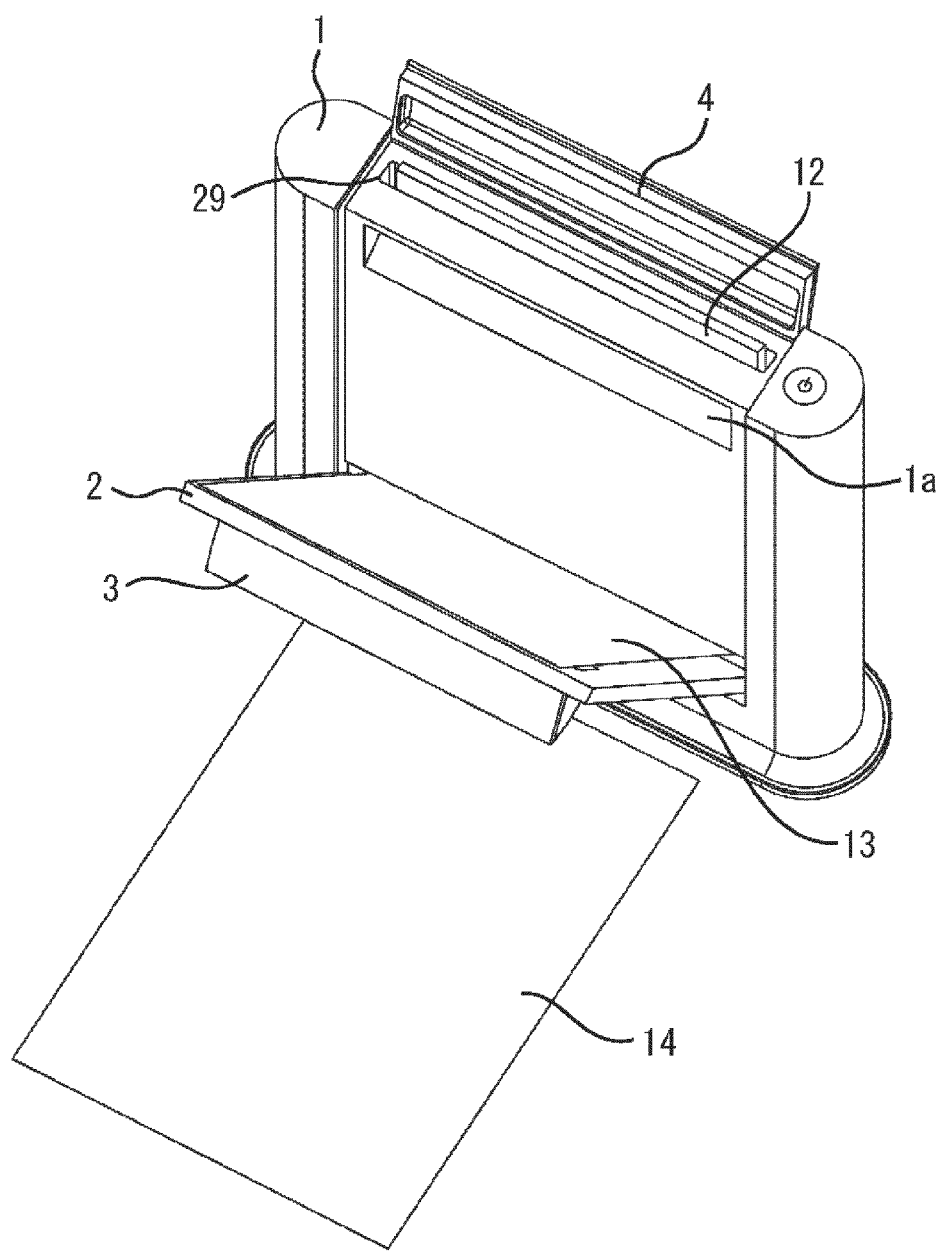
FIG. 2 illustrates an external view of the apparatus in use.

FIG. 1 is an appearance perspective view of the MFP not in use, and FIG. 2 is an external perspective view of the MFP in use.

A lid 2 which serves as a sheet discharge tray is attached to a housing 1 so as to be opened and closed by a hinge mechanism which uses a bottom portion of the lid 2 as a spindle. A camera unit 3 is retractably attached to a part of the lids. When a user opens the lid 2, the camera unit 3 accordingly moves outwardly from the housing 1 and rotates by its own weight. The camera unit 3 is retracted into the housing 1 when in a state of FIG. 1. The camera unit 3 is configured as a projection camera for imaging and reading a document sheet placed therebelow. A cover 4 is attached to the housing 1 so as to be opened and closed by a hinge mechanism. The cover 4 is closed when the MFP is not in use.

When the user opens the lid 2 which is perpendicularly set when it is closed, the lid 2 rotates by the hinge mechanism at the bottom portion thereof, and then stops at a holding angle other than the perpendicular (for example, at about 30 degrees from a line perpendicular to an installation floor surface.) When the user opens the cover 4, a supply slot 29 appears. The user inserts a sheet 12 into the supply slot 29 to set it to a sheet supply unit inside the MFP. A single sheet or a plurality of the sheets 12 can be inserted into the supply slot 29.

Figure 3:
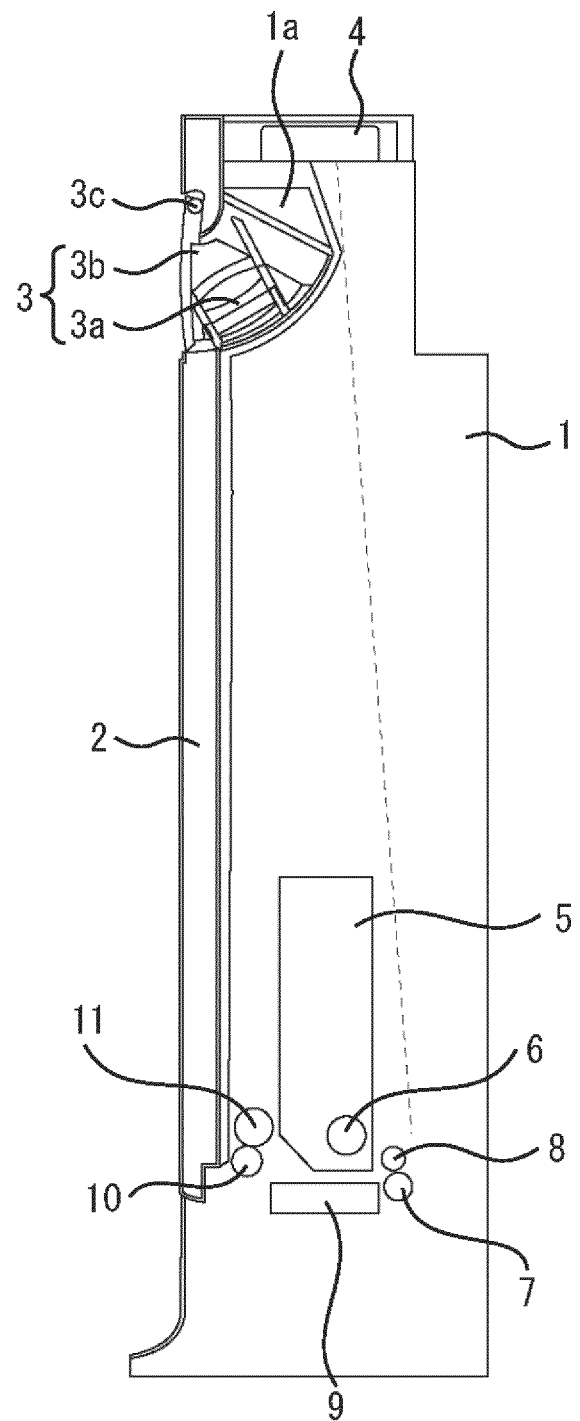
FIG. 3 illustrates an internal configuration of the apparatus not in use.
Figure 4:
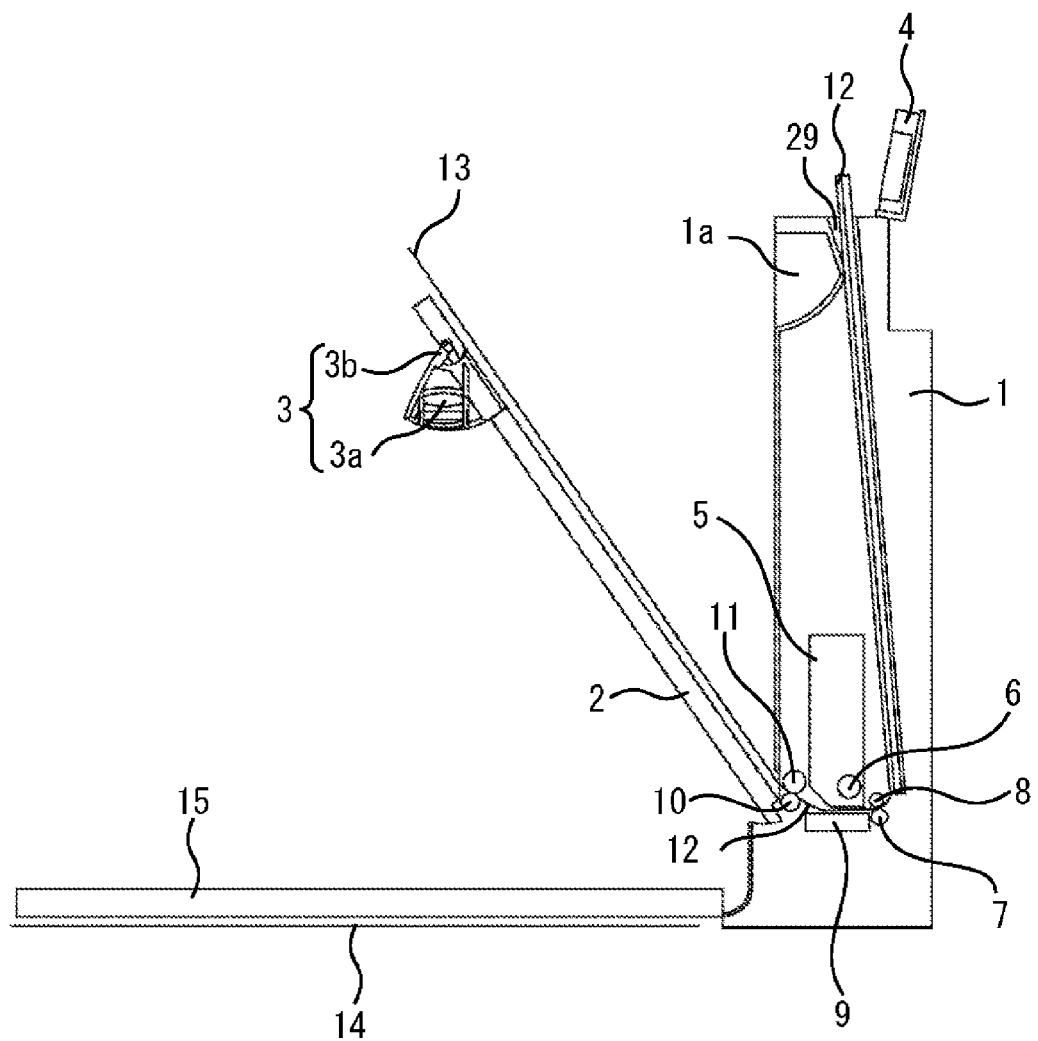
FIG. 4 illustrates an internal configuration of the apparatus in use.

FIG. 3 is a sectional view illustrating the internal configuration of the MFP not in use (the state illustrated in FIG. 1), and FIG. 4 is a sectional view illustrating the internal configuration of the MFP in use (the state illustrated in FIG. 2).

The housing 1 mainly includes a printing unit, the camera unit 3, and a sheet conveyance mechanism. The printing unit includes a carriage 5 which reciprocally moves a print head mounted thereon in a main scanning direction (a direction perpendicular to a paper surface of FIG. 3) along a guide shaft 6. Various types of inkjet print head may be used, which employs, for example, a heating element, a piezo-electric element, an electrostatic element, or a micro-electromechanical system (MEMS) element.

The camera unit 3 includes a camera 3a and a cover 3b. The camera 3a includes an image sensor and an optical system. Focus and zoom magnification of the optical system can be automatically controlled by a controller. The camera 3a and the cover 3b are integrated to form a retractable structure which rotates around a spindle 3c at an end of the cover 3b, so as to switch between retraction into the housing 1 and protrusion from the outer surface of the lid 2. The camera unit 3 is moved to a position facing a reading position outside the housing 1 when the MFP is used. When the MFP is not used, the user closes the lid 2 and the cover 4. In this state, they become a part of the outer surface of the MFP, and the camera unit 3 is stored in a hollow 1a and only the cover 3b exposed to the outside. Therefore, when the MFP is not in use, it has an oblong box shape and there is no portion largely protruding from the outer surface, so that the MFP has a small footprint and is compact and easy to handle.

The sheet conveyance mechanism includes a conveyance roller pair (a conveyance roller 7 and an assist roller 8), a platen 9, and a discharge roller pair (a discharge roller 10 and an assist roller 11) sequentially from an upstream side in the sheet conveyance direction.

To use the MFP, the user opens the lid 2 and the cover 4, as shown in FIG. 4. When the user opens the lid 2, the camera unit 3 moves outwardly from the housing 1 while rotating by its own weight, and is protruded from the outer surface of the lid 2. Then, the user inserts one sheet 12 or the plurality of sheets 12 for printing into the supply slot 29. The sheets 12 are held at the sheet supply unit inside the housing 1.

When an image is to be formed and printed, the sheets 12 inserted from the supply slot 29 by the user and held at the sheet supply unit are supplied one by one to the printing unit. The sheet 12 is conveyed by the conveyance roller pair (the conveyance roller 7 and the assist roller 8) and moved in a sub scanning direction on the platen 9. In the meantime, the carriage 5 is reciprocally moved in the main scanning direction, and ink is discharged from the print head mounted on the carriage 5 to form an image on the sheet 12. Then, the sheet 12 is conveyed by the discharge roller pair (the discharging roller 10 and the assist roller 11) and discharged onto the lid 2. The lid 2 serves not only as a supporting member for supporting the camera unit 3 but also as a sheet discharge tray. When a plurality of sheets are printed, discharged sheets 13 are stacked one by one on the lid 2.

When an image is to be read, the user places a document sheet 14 to be read at the reading position below the camera unit 3. Then, the user places a transparent pressing plate 15 onto the document sheet 14, and captures an image of the document sheet by the camera unit 3 while the document sheet 14 remains stationary. The pressing plate 15 is a plate-like member made of a transparent material, and may be rotatably supported relative to the housing 1 by a hinge mechanism. Alternatively, the pressing plate 15 may be provided separately from the MFP, and the user may place it on the document sheet 14. The pressing plate 15 prevents the document sheet 14 at the reading position from partially lifting by curl. Accordingly, the reading surface of the document sheet 14 can be prevented from deviating from a depth of field of the camera unit 3, thus defocusing of the read image can be prevented.

Figure 12:
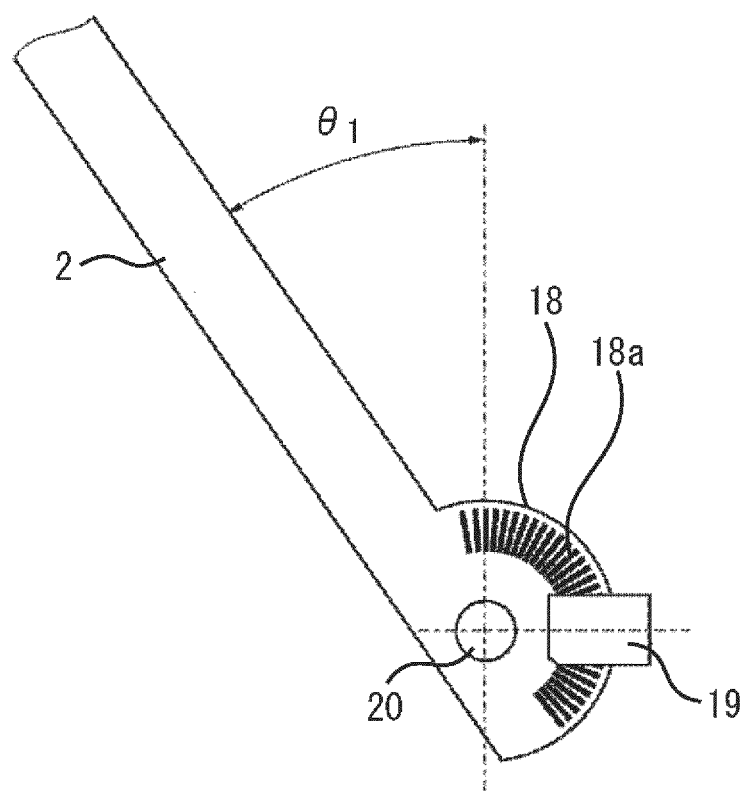
FIG. 12 illustrates a configuration of an encoder mechanism.

FIG. 12 is a partial enlarged view of a vicinity of the hinge mechanism of the lid 2. The hinge mechanism has a circular slit plate 18 which rotates around a spindle 20 together with the lid 2. The slit plate 18 is provided with slit patterns 18a at intervals of unit angle. An optical sensor 19 optically reads the slit patterns 18a and generates pulse signals. A number of pulse signals to be generated corresponds to the rotational angle of the lid 2. The controller counts the number of pulses after the user opens the sheet discharge tray to detect a holding angle $\theta 1$ of the lid 2. The hinge mechanism is provided with an encoder mechanism for detecting the angle of the lid 2 in this way.

Figure 5:
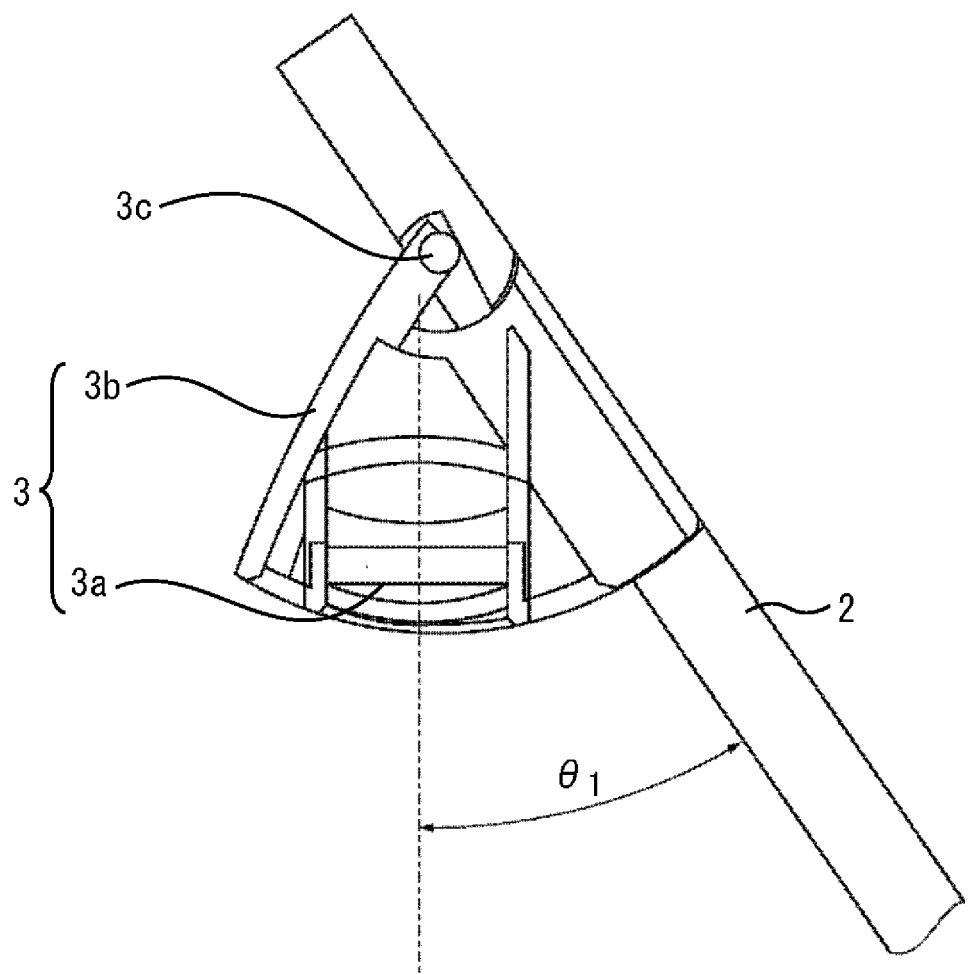
FIG. 5 illustrates a sectional view of a camera unit.

Referring to FIG. 5, the camera unit 3 is retractably attached to the lid 2. The camera unit 3 is constantly oriented just downward by a moment caused by its own weight to face the reading position. When the user opens the lid 2 and its angle changes, the camera unit 3 accordingly rotates by itself and captures an image on the reading surface of the sheet from the perpendicular direction. Therefore, a reading optical axis of the camera 3a forms an angle $\theta 1$ relative to the lid 2. Since the angle $\theta 1$ can be detected by the above-mentioned encoder mechanism, a distance between the camera 3a and the reading surface of the document sheet 14 can be calculated based on the angle $\theta 1$.

Figure 6:
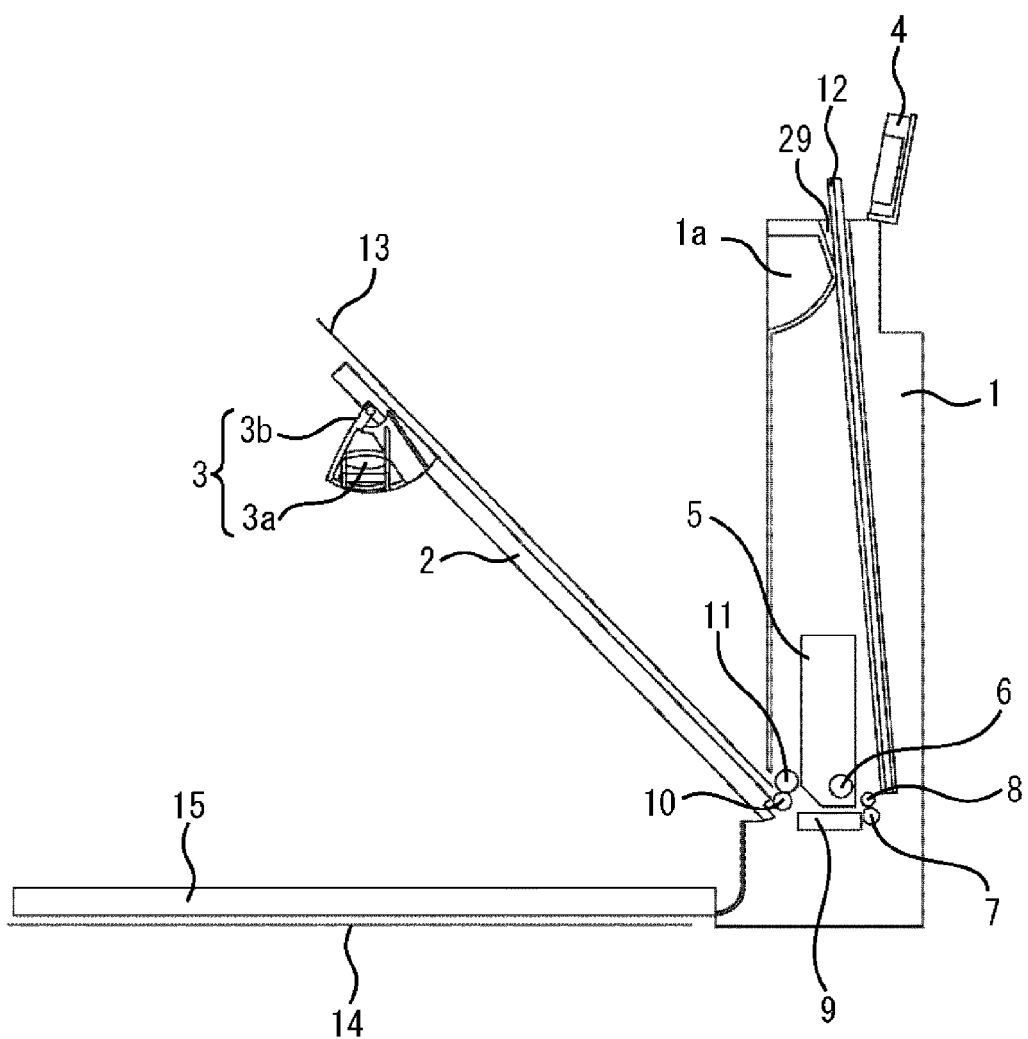
FIG. 6 illustrates when an angle of a sheet discharge tray changes.
Figure 7:
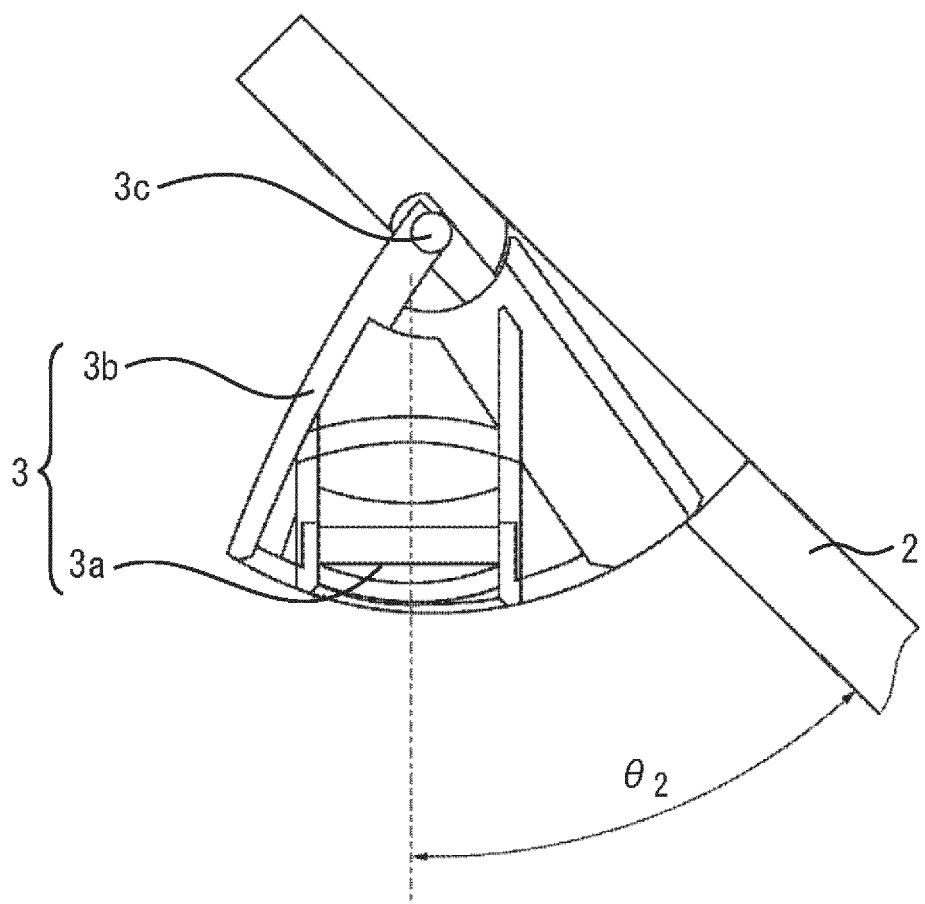
FIG. 7 illustrates a sectional view of the camera unit when the angle of the sheet discharge tray changes.

When many discharged sheets 13 are stacked on the lid 2, the holding angle of the lid 2 may become larger than that of FIG. 4 by the weight of the discharged sheets 13, as shown in FIG. 6. Accordingly, the distance between the camera 3a and the document sheet 14 decreases. In this case, since the camera unit 3 is constantly oriented downward by its own weight, the angle relative to the lid 2 changes to an angle $\theta 2$, as shown in FIG. 7. Since $\theta 2$ is larger than $\theta 1$, the distance between the camera 3a and the reading surface of the document sheet 14 is smaller than that of FIG. 4. To eliminate this effect, the controller detects the change in distance between the camera 3a and the reading surface of the document sheet 14 based on an angular difference between $\theta 2$ and $\theta 1$. Reading conditions of the optical system of the camera 3a, such as a focal length and zoom magnification, are adjusted to compensate the change in detected distance, thus a constant focal position and a constant reading range can be maintained. Accordingly, the surface of the document sheet 14 can be correctly read without being affected by the change in height of the camera 3a caused by the change in the holding angle of the lid 2.

For focal position control, an auto-focus mechanism for automatically adjusting focus may be provided to maximize a contrast of the image to be captured. Instead of optically adjusting the reading range by optical zoom, it may be possible to change a trimming range of the image obtained by the image sensor based on the angle detected by the encoder mechanism.

As described above, the MFP according to the present exemplary embodiment uses a projection camera instead of a flat-bed type scanner. When the MFP is not in use, the lid 2 (sheet discharge tray) and the camera unit 3 are retracted into the housing 1 having the oblong box shape. Accordingly, the footprint when the MFP is not in use can be reduced, and a compact and easy-to-handle MFP can be provided.

An MFP according to a second exemplary embodiment will be described below. The same reference numerals as in diagrams of the first exemplary embodiment denote identical or equivalent members.

Figure 8:
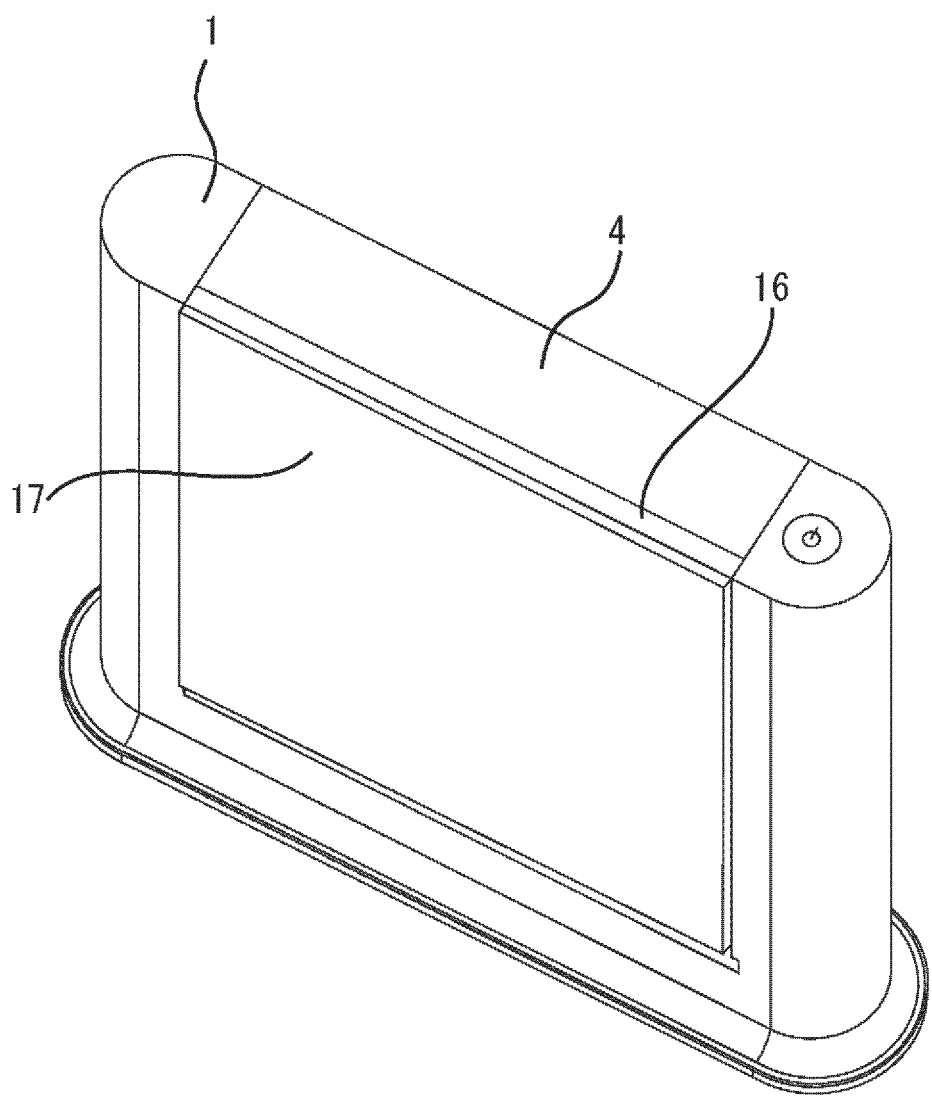
FIG. 8 illustrates an external view of an apparatus not in use according to a second exemplary embodiment.
Figure 9:
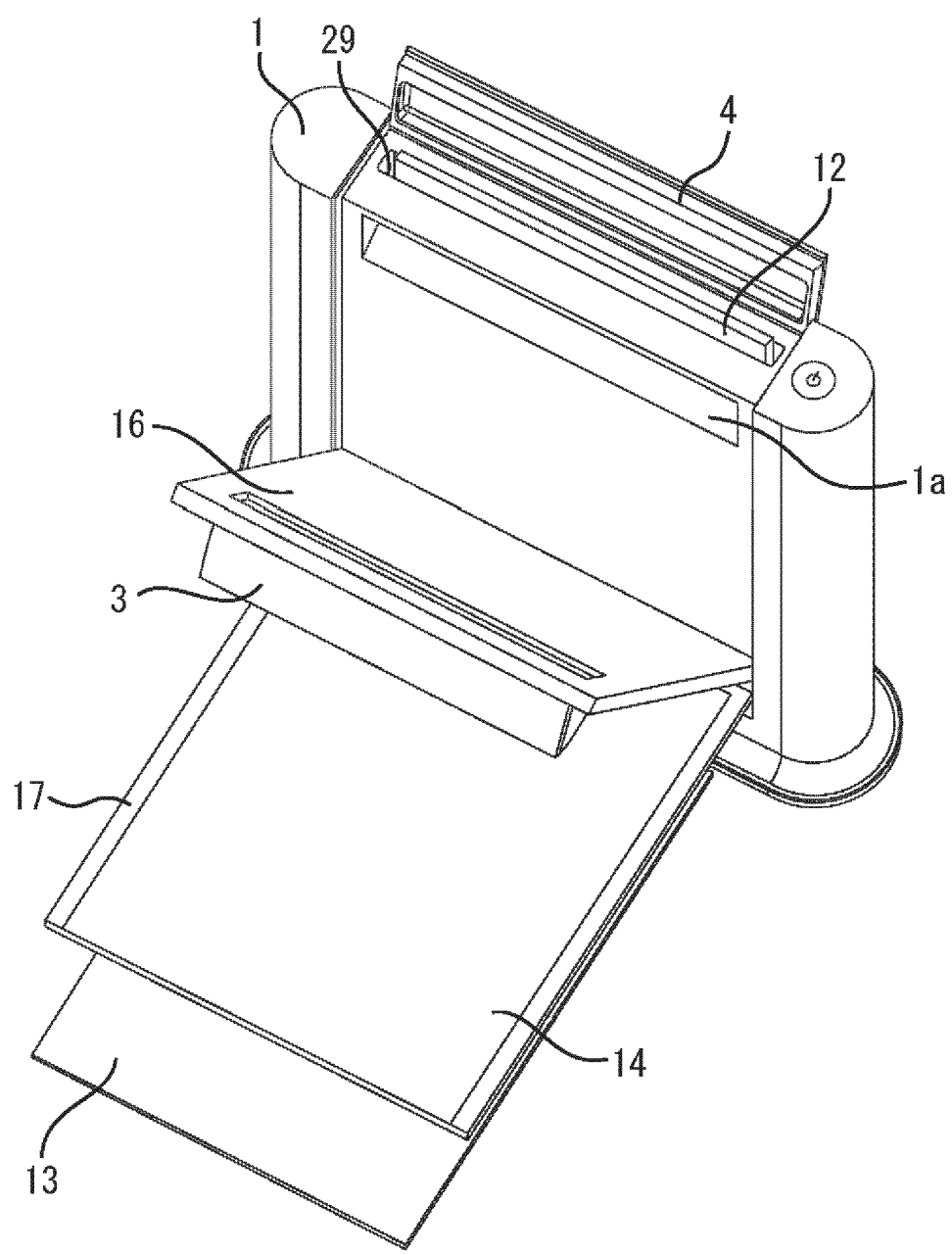
FIG. 9 illustrates an external view of the apparatus in use.

FIG. 8 is an external perspective view of the MFP not in use, and FIG. 9 is an external perspective view of the MFP in use.

A housing 1 is provided with a lid 16 and a document tray 17 so that each of them is opened and closed by a hinge mechanism. The lid 16 and the document tray 17 are closed when the MFP is not in use. When they are closed, the lid 16 becomes a part of an inner wall of the MFP, and the document tray 17 becomes a part of the outer surface of the MFP.

When the MFP is used, a user opens the document tray 17 first. The document tray 17 is held in a horizontal position, i.e., in parallel with the installation floor surface, so that the user can place a document sheet 14 to be read on the document tray 17. Then, the user opens the lid 16. The lid 16 is held at a position whose angle is smaller than the document tray 17 (for example, at about 45 degrees from a line perpendicular to the installation floor surface). Similar to the first exemplary embodiment, a camera unit 3 is retractably attached to a part of the lids 16 so as to rotate by its own weight.

Figure 10:
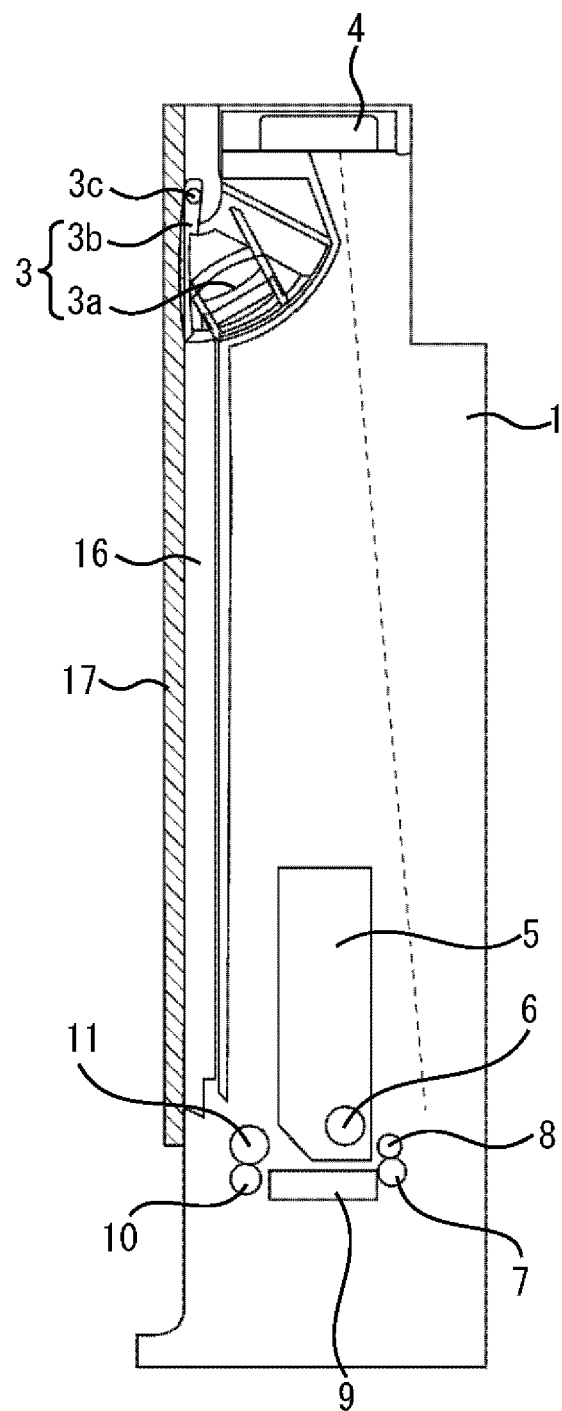
FIG. 10 illustrates an internal configuration of the apparatus not in use.
Figure 11:
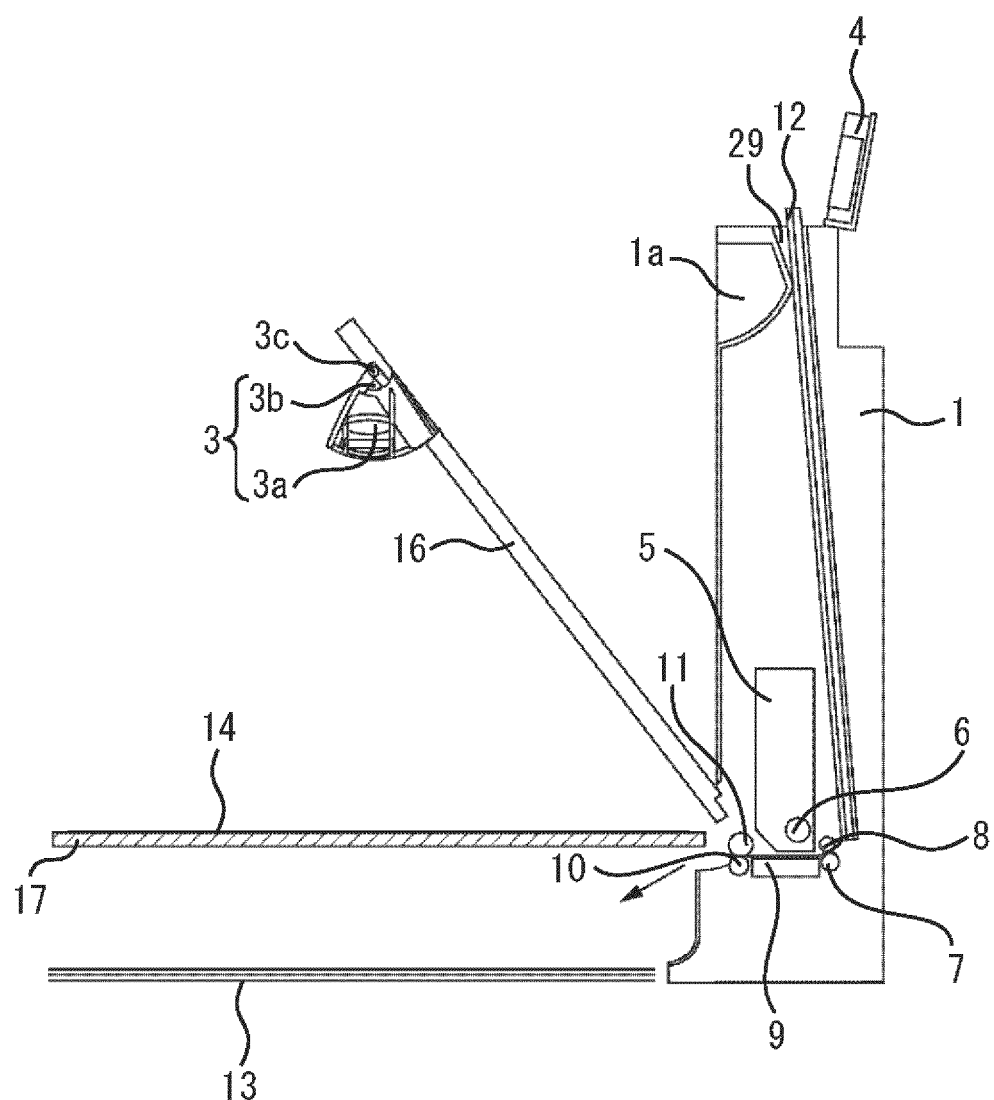
FIG. 11 illustrates an internal configuration of the apparatus in use.

FIG. 10 is a sectional view illustrating the internal configuration of the MFP which is not in use (the state illustrated in FIG. 8), and FIG. 11 is a sectional view illustrating the internal configuration of the MFP in use (the state illustrated in FIG. 9).

The housing 1 mainly includes a printing unit, the camera unit 13, and a sheet conveyance mechanism. The present exemplary embodiment differs from the first exemplary embodiment in the conveyance direction of a sheet which is discharged by a discharging roller 10 and an assist roller 11. More specifically, a printed sheet is discharged not in the direction of the lid 16 but in the direction shown by an arrow in FIG. 11 as a discharged sheet 13 on the installation floor below the document tray 17.

When an image is to be read, the user places the document sheet 14 to be read at a reading position on the document tray 17. While the document sheet 14 remains stationary, the camera unit 3 captures an image of the document sheet from right above. The user may place a transparent pressing plate similar to the one used in the first exemplary embodiment on the document sheet 14 on the document tray 17. According to the configuration of the second exemplary embodiment, since no sheet is placed on the lid 16, the holding angle is stable and an encoder mechanism for detecting the angle of the lid 16 can be omitted.

When the MFP is not used, the user closes the lid 16 and the document tray 17, as shown in FIGS. 8 and 10. In this state, the camera unit 3 is retracted into the housing 1. Therefore, the MFP has an oblong box shape and there is no portion largely protruding from the outer surface, so that the MFP has a small footprint and is compact and easy to handle.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-233168 filed Sep. 11, 2008, which is hereby incorporated by reference herein in its entirety.

What is claimed is:

1. An apparatus comprising:
a printing unit disposed in a housing and configured to form an image on a sheet;
a lid attached to the housing by a hinge mechanism so as to be opened and closed;
a camera unit attached to the lid and configured to read a document placed at a reading position, wherein when the lid opens, the camera unit can read the document which is placed at the reading position below the camera unit;
an obtaining unit configured to obtain information relating to an angle of the lid which is opened, wherein reading condition with the camera unit is adjusted according to the information; and
a document tray which is attached to the housing so as to be opened and closed by a hinge mechanism and on which the document to be read by the camera unit is placed, wherein the sheet printed by the printing unit is discharged below the document tray.

2. The apparatus according to claim 1, wherein the housing has an oblong box shape having a bottom surface which is smaller than a side surface.

3. The apparatus according to claim 1, wherein, the camera unit is retracted within the housing when the lid is closed, and the camera unit is moved to a position facing the reading position outside the housing when the lid is opened.

4. The apparatus according to claim 3, wherein the hinge mechanism supports a bottom portion of the lid, and, when the lid is opened, the lid being inclined with respect to the housing, and the camera unit rotates to face the reading position therebelow.

5. The apparatus according to claim 1, wherein the obtaining unit comprises a sensor for detecting an angle of the lid.

6. The apparatus according to claim 1, wherein the reading condition comprises at least one of a focus condition of the camera unit, a zoom magnification of the camera, and a trimming range of an image obtained by the camera unit.

7. An apparatus comprising:
a printing unit disposed in a housing and configured to form an image on a sheet;
a lid attached to the housing by a hinge mechanism so as to be opened and closed; and
a camera unit retractably attached to the lid and configured to read a document placed at a reading position, wherein when the lid opens, the camera unit rotates to face the reading position therebelow; and
a document tray which is attached to the housing so as to be opened and closed by a hinge mechanism and on which the document to be read by the camera unit is placed, wherein the sheet printed by the printing unit is discharged below the document tray.

8. The apparatus according to claim 7, wherein the housing has an oblong box shape having a bottom surface which is smaller than a side surface.

9. The apparatus according to claim 7,
wherein the camera unit is retracted within the housing when the lid is closed, and the camera unit is moved to a position facing the reading position outside the housing when the lid is opened.

10. The apparatus according to claim 9, wherein the hinge mechanism supports a bottom portion of the lid, and, when the lid is opened, the lid being inclined with respect to the housing, and the camera unit rotates by its own weigh.

* * * * *